Feb. 22, 1938.　　　　P. MacKENZIE　　　　2,109,070
AIR CONTROL VALVE FOR GEAR SHIFTS
Filed April 7, 1936　　　　2 Sheets-Sheet 1

INVENTOR.
PHILIP MacKENZIE
BY Miller Boyken & Bried
ATTORNEYS.

Feb. 22, 1938.    P. MacKENZIE    2,109,070
AIR CONTROL VALVE FOR GEAR SHIFTS
Filed April 7, 1936    2 Sheets-Sheet 2

INVENTOR.
PHILIP MacKENZIE
BY Miller Boyken & Bried
ATTORNEYS.

Patented Feb. 22, 1938

2,109,070

UNITED STATES PATENT OFFICE

2,109,070

AIR CONTROL VALVE FOR GEAR SHIFTS

Philip MacKenzie, Oakland, Calif.

Application April 7, 1936, Serial No. 73,091

8 Claims. (Cl. 137—139)

This invention relates to means for shifting gears in transmission gear systems, particularly remote control of such gear shifting for automobiles by means of air or vacuum lines operated by the driver.

The principal object of the invention is to provide improved valve means operated by the driver, for shifting or transposing of the various air lines to effect the desired shifting of the gears. A particular object is to provide a remote control multiple air valve for operation by the driver which will preserve the regular motions required in ordinary automobile gear shifting, so as to thereby gain this important measure of safety, especially in emergencies, as the operations of shifting gears with the lever and H slot arrangement has become a matter of habit which it is one of the objects of this invention to take advantage of by supplying a remote control air valve which operates with precisely the same motion as an ordinary gear shift lever.

Other features and advantages of the invention will appear in the following description and accompanying drawings.

In the drawings Fig. 1 is a plan view of my remote gear control air valve showing the control lever projecting out of an H slot.

Figure 1:
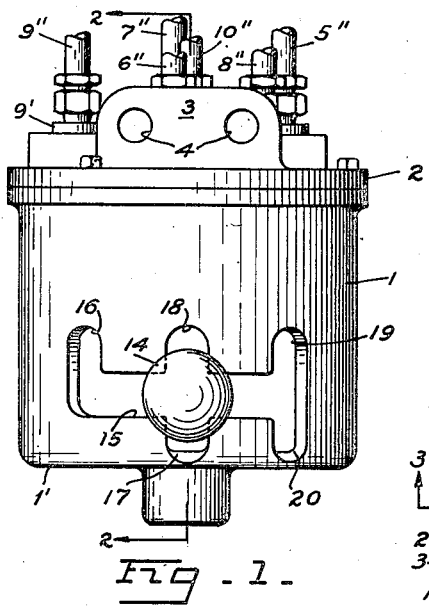

Before describing the invention in detail, it better be generally described so that the detailed description will be easier understood.

Briefly described the invention comprises an air valve casing which bolts to a bracket on the dash of an automobile in a place just above and in place of the usual mechanical gear shift lever, and from which casing projects a hand lever which works in an H slot just the same as the conventional gear shift lever, to shift the gears, the only difference being that the operating lever instead of directly operating the gears, operates a sliding valve passage block over the face of a valve plate having a plurality of ports through it, and with any of which the valve block can be aligned to thereby connect the air pressure (or a suction line) with a pipe extending to any suitable form of pneumatically operated gear shift, each valve plate opening with a certain position of the hand lever in the H slot connecting respectively with one of several pipes for operating the particular gear which would ordinarily be operated by the ordinary hand shift lever when in the same position in the H slot, and similarly when moved along the horizontal arm of the H slot being arranged to insure the gears being out of mesh or in neutral.

Since the present invention is concerned only with the construction of the air control valve, and its object is to control compressed air or suction impulses through a plurality of pipes leading to and from an air-operated gear shift at a remote point, and the air-operated gear shift itself may take a variety of forms, no drawing or detailed description of the gear shift itself will be undertaken, though it will be helpful to say that it is preferably one in which the gears are shifted by air or suction-operated pistons, and that after each movement is made to shift a gear, before another gear is thrown into mesh, a neutral pipe line is positively operated to insure the gears being first thrown to free or neutral position. In the present description the neutral pipe or port is so designated. Besides the above, the spent air released after each gear is thrown out of mesh is exhausted from the gear shifting piston by way of the remote control valve through the same line which first sent the impulse to the piston.

The H slot of the gear shift valve may be arranged for the usual three speeds forward and one reverse, or may have additional speeds forward or reverse by providing an extra leg or legs to the slot and correspondingly more air valve ports and pipes. The device of the present drawings is shown with a slot for one reverse speed and four forward speeds. With the above general description of the invention the detailed construction of the air valve will now be undertaken.

The remote control valve comprises a cylindrical cup or casing I permanently closed at the forward end by a wall I' and closed at its rear end by a plate or valve plate 2 suitably held in place by screws indicated, and provided with a bolting lug 3 having suitable holes 4 to facilitate securing the device rigidly to the dash of an automobile.

The valve plate 2 is provided with a plurality of apertures or valve ports 5, 6, 7, 8, 9, 10 which extend out of suitable threaded bosses 5', etc., and which are suitably connected to the air pipe lines 5'' etc. There is also a general exhaust opening 11 in the valve plate to direct exhausting air from any pipe line down under the dash after shifting a gear and consequently releasing the air from the previously connected pipe.

At the lower margin of the device is another port 12 which constitutes the inlet for the operating air under pressure from any convenient pump or compressed air tank, not shown, or if vacuum-operated gear shift is used this would go to a source of suction. The supply pipe connected to this port is designated 12', and the port 12 in the valve plate aligns with a port 12'' formed in the casing and extending to a central hub 13 from where it is led selectively to the various gear shift ports as will be presently described.

The upper curved wall of the casing is provided with an H slot for the hand lever 14 which is similar to a gear shift lever, but much shorter. The H slot comprises a transverse or neutral portion 15, side notch 16 for reverse speed, and four side notches 17, 18, 19 and 20, for the four progressively increasing forward drives, though, instead of four forward speeds, three or any other number may be provided.

The main mechanical function of the device is to provide for switching the air inlet port 12'' selectively to any of the air outlet ports 5, 6, 7, 8, 9, when shoving the hand lever into any of the notches respectively corresponding thereto, and always into connection with neutral port 10 when the lever is in transverse slot 15, thus always to insure the gears being in neutral except when the lever is pushed into a notch.

To accomplish the switching of the air from inlet port 12'' as explained, I provide a sliding valve passage block 21 which is connected by a link 22 and universal connection 46 to a small crank arm 23 to the hub 24 of hand lever 14 is screwed, all in such a manner that a port 25 in an insert 26 carried by the block, may be slid to position and aligned over any of the plate ports, while at the same time an air-tight connection of port 25 with inlet port 12'' is at all times maintained.

Figure 2:
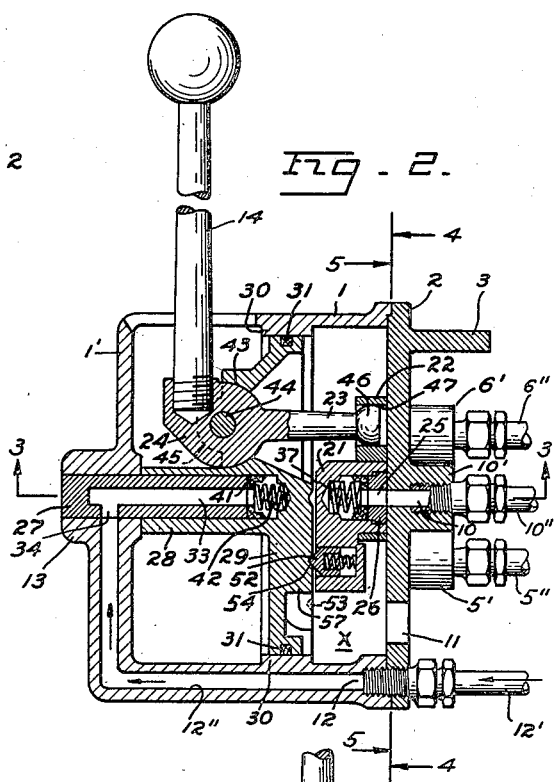
Fig. 2 is a vertical cross section of the device of Fig. 1 as taken along the line 2—2 thereof.
Figure 6:
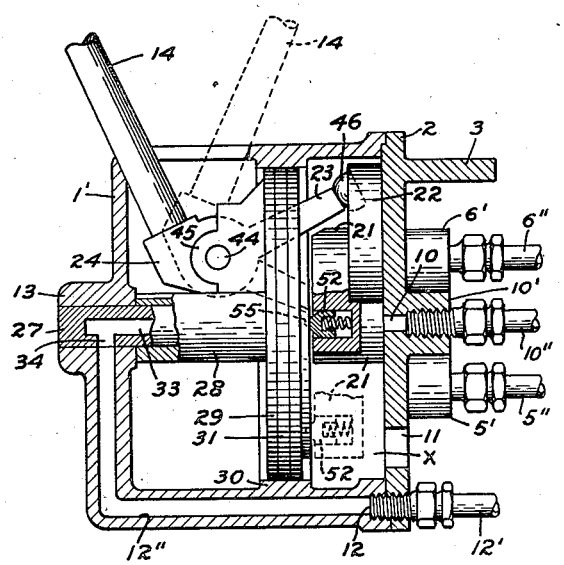
Fig. 6 is a view similar to that of Fig. 2 but with the hand lever shifted, and also shown dotted in still another position.

The construction by which the above is accomplished includes a central hollow stub shaft 27 pressed tightly through a bore in hub 13 and revolvably supported on which stub shaft is the hub 28 of a disk 29 and which disk is turned at its periphery to fit revolvably within an interiorly finished portion 30 of the casing and preferably provided with a peripheral packing ring 31. Hub 28 has a radial extension 28' on one side (see Fig. 3) in which is formed a tortuous air channel 32 which connects at its inner end with the bore 33 of the hollow stub shaft 27 and which bore has a side port 34 connecting with air inlet passage 12'' as shown in Figs. 2 and 6, while the opposite end of channel 32 connects with a passage or bore 35 formed in a round elongated hub 21' formed integrally on or pressed tightly into sliding valve block 21 and passage 35 connects within said block to a passage 36 (see Fig. 3) to port 25 normally terminating air-tight against the finished flat inner face of valve disk 2 unless aligned with one of the valve disk ports.

Insert member 26 is nicely, though slidably, fitted in a bore in the side of block 21 and is resiliently urged outwardly against the face of the valve disk by means of a small coiled compression spring 37 acting against a cup leather 38 at the inner end of member 26 which also seals the joint at this point.

Figure 3:
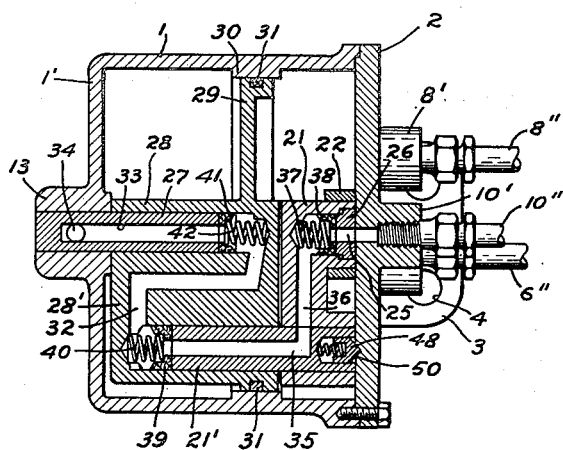
Fig. 3 is a horizontal cross section of the device as seen from the line 3—3 of Fig. 2.

The joint between members 21' and 28' is sealed by a cup leather 39 and block 21 is resiliently urged toward the face of the valve disk 2 by a small compression spring 40 as shown in Fig. 3. The joint between members 27 and 28 is similarly sealed by a cup leather 41 and spring 42.

The hub 24 of crank arm 23 is preferably hemispherical and seated in a socket 43 formed on member 29 and pivotally held in place by a pin 44 extending at right angles to the hand lever 14 (or parallel to the dash of the automobile) and which pin is supported at its ends in lugs 45 extending from the edges of socket 43. The free end of crank arm 23 is formed with a ball portion 46 fitting revolvably and slidably within a bore 47 in the outer end of link 22 to form a universal connection, and the other or inner end of link 22 is bored to revolvably embrace the end of sliding block 21.

By the construction above described it will be manifest that by moving the hand lever along portion 15 of the so-called H slot it will revolve member 29 and also carry block 21 and all associated parts about the axis of stub shaft 27, and while thus revolving the parts port 25 will always be central and aligned with neutral port 10 in the valve plate 2. Also that when the lever is aligned with any of the slot notches 16, 17, 18, 19 or 20, it may be pushed or pulled into one in the same way as a common gear shift lever and upon doing so the crank 23 will raise or lower link 22 and slide the valve block 21 up or down upon the surface of the valve plate to thereby bring the port 25 into alignment with any of the other valve plate ports 5, 6, 7, 8, or 9, to send compressed air through any desired pipe for actuating the desired gear shift.

Also to be observed is that when the sliding block is aligned with any one port the previously connected port is at once opened to space X in the casing between disk 29 and valve plate 2 and can then freely exhaust out of opening 11 and not blow up through the lever slot to annoy the driver.

In order to hold the lever in the various shifted positions with valve plate ports aligned with port 25 of the sliding block suitable spring detents are provided both to hold the disk 29 at proper points in its rotation and crank 23 at different points in its up and down motion. The spring detent for the bodily rotary motion of member 29 is indicated at 48 at the inner end of member 21' fitting into suitable depressions 49, 50, 51, at various positions of rotation corresponding to the notches in the hand lever slot. The detent for the three (in or out and neutral) positions of the hand lever 14 is shown in detail at 52 on the inner side of the block 21 operating into depressions 53, 54, 55, formed in member 29.

Figure 4:
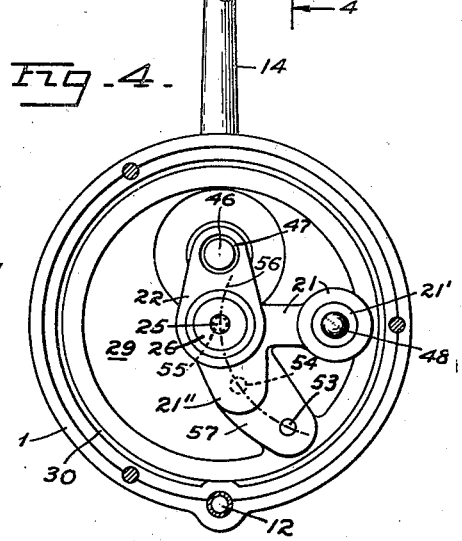
Fig. 4 is a rear elevation as taken from the line 4—4 of Fig. 2 just forward of the valve plate.
Figure 9:
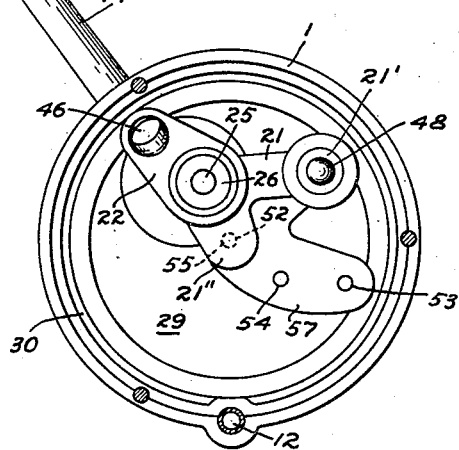
Fig. 9 is a similar view to that of Fig. 8 but showing the position of the valve block when the handle is pushed forward to the dotted position of Fig. 6.

As the hand lever is pushed in or out of the slot notches the link 22 swings the valve block assemblage in an arc from the axis of member 21 or along the dotted arcuate line 56 shown in Fig. 4 and wherein the surface 57 is a boss on member 29 formed with detent depressions 53, 54 and 55, the last one being directly under port 25 in this figure, but more clearly indicated in Fig. 9 where it is coincident with detent 55 which is carried in a lug 21'' extending from block 21.

Figure 7:
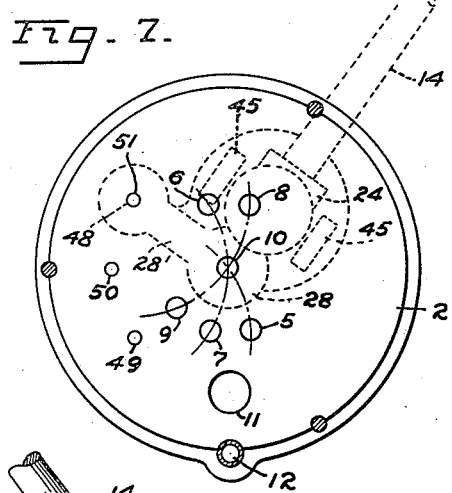
Fig. 7 is a view similar to that of Fig. 5 but showing the hand lever and its sliding valve block dotted in one position.
Figure 8:
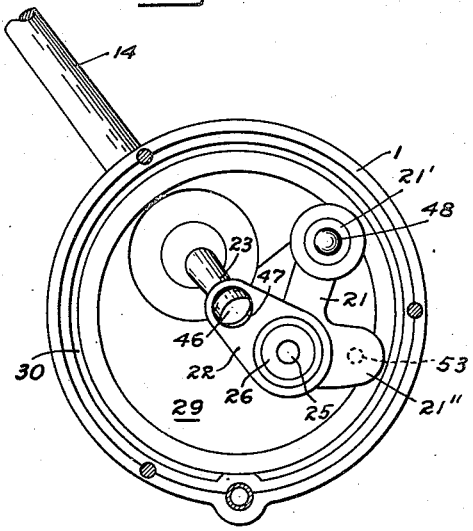
Fig. 8 is an end view of the device with the valve plate omitted and showing the position of the valve block when the hand lever is pulled back into one of the H slot notches.

It is to be understood that arc 56 indicated in Figs. 4 and 7 represents the travel of the port 25 of block 21 when detent 48 is engaged in depression 50 and the hand lever is swung forward and backward in the notches 17 and 18, whereas when the lever is moved along the H slot to the other notches the detent 48 engages either depression 49 or 51 and then the port 25 will travel in the other arcs struck from those depressions as shown in Fig. 7 and thus bring port 25 to coincidence selectively with any of the ports 5, 6, 7, 8, 9, in plate 2, and when passing from any one to the other, by necessary intermediate alignment with neutral port 10.

Figure 5:
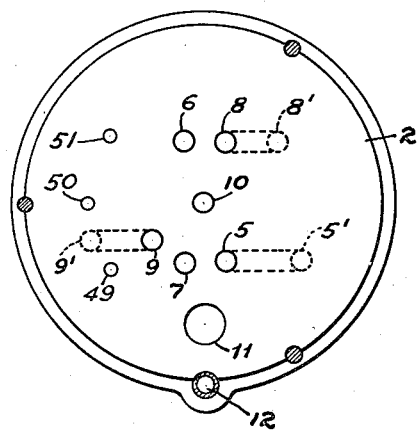
Fig. 5 is a view of the front or operative face of the valve plate as seen from the line 5—5 of Fig. 2.

Some of the ports in the valve plate are necessarily somewhat too close together to permit convenient connection of the pipes on the outer side of the plate, and therefore three of the ports, namely, 5, 8 and 9, are extended laterally within the plate as shown in dotted lines in Fig. 5 to emerge for the pipe connections respectively at 5', 8' and 9'.

From the above description the operation of the device will be seen to be precisely like an ordinary automobile gear shift lever, and that it will convey the necessary air impulses, or suction, at the usual points of shifting to operate any desired form of air or suction (or other fluid) operated gear shift, either relatively close or remotely situated. Also that it provides for any number of speeds, and my use of the words "H slot" herein, or in the claims, is intended to include any number of notches in the lever slot and any number of valve ports operated thereby.

Also my use of the words "air", "air pressure", or "fluid pressure", herein, and/or in the claims, is to be taken as including negative as well as positive pressure, as well as air, gas, or any fluid or liquid.

I therefore claim:

1. A fluid control valve for motor vehicle gear shift comprising a flat plate having a plurality of spaced valve ports arranged therein for respectively connecting to pipe lines for operating the gear shift, a movable valve block slidable on said plate and having an air port arranged for alignment with one at a time only of any of said ports upon sliding of the block, a hand lever, means supporting and guiding said hand lever for bodily arcuate movement as well as forward and backward movement in planes transversely of said arcuate movement, and means forming an operative connection between said lever and said valve block whereby the block may be shifted to align its air port with one at a time only of any of said ports selectively as said hand lever is moved to various positions along the paths indicated, the construction including means always insuring the positive intermediate alignment of the valve block air port with one in particular only of said valve ports of the plate during its shifting from any of the other ports to another, and means continuously connecting the slidable block with a source of operating fluid.

2. A remote control valve for an automotive gear shift comprising a casing, a pivotally mounted lever projecting out of a conventional H slot in said casing, a flat valve plate in said casing having a plurality of fluid ports therein, a passageway for admitting fluid under pressure to said casing, a movable passage block arranged to slide around on the surface of said valve plate and provided with a port at one end of its passage adapted to be aligned over any of said fluid ports, means providing a constant connection of the opposite end of said passage to said passageway yet permitting movement of the block, and means operatively connecting said lever to said block, the arrangement providing for sliding said block on the plate and aligning its port with any of said ports selectively upon operating said lever.

3. A remote control valve for an automotive gear shift comprising a valve plate having a series of spaced ports in its surface, an operating fluid passageway, a jointed member having a passage connected at one end to said passageway, a movable block having a port extending therethrough always connected at one end to said passage and adapted to have its other end aligned with any of said spaced ports in the valve plate when the block is slid to various positions on said plate, and hand-operated means for sliding said block upon said valve plate to selectively align its port with the ports in the valve plate.

4. A remote control valve for an automotive gear shift comprising a valve plate having a series of spaced ports in its surface, an operating fluid passageway, a jointed member having a passage connected at one end to said passageway, a movable block having a port extending therethrough always connected at one end to said passage and adapted to have its other end aligned with any of said spaced ports in the valve plate when the block is slid to various positions on said plate, and a hand-operated lever guided in a conventional H slot arranged for sliding said block upon said valve plate to selectively align its port with the ports in the valve plate.

5. A remote control valve of the character described comprising a casing having its side wall slotted in general H formation, a hand lever projecting out of the slot, a member revolvable within said casing and to which said lever is pivoted whereby it may be moved bodily along the horizontal run of the H slot and will revolve said member, and whereby when said lever is opposite any of the legs of said slot it may be rocked into the same, a crank extension on the inner end of said lever, a valve passage block member pivotally mounted on the revolvable member, a link connecting the valve passage block member with said crank, whereby upon movement of the lever transversely of the slot into the legs thereof the block will be moved by the crank, a valve plate secured to said casing and having a plurality of ports, and upon which plate said block slides for aligning the end of its passage with any of said ports selectively as the lever is rocked and/or revolved, and means for maintaining a connection of the opposite end of said passage with a source of operating fluid.

6. In a remote control fluid valve, a valve plate having a plurality of ports therethrough, a fixed passageway for operating fluid, a block slidable about said plate and provided with a passage through it with one end terminating at the plate and adapted to be aligned with any of said ports, means maintaining a constant flexible connection between said fixed passageway and the opposite end of said passage, and hand-operated means for sliding said block about the surface of said plate.

7. In a construction as specified in claim 6, spring detent means arranged to resiliently hold said block in alignment with any of said ports.

8. In a construction as specified in claim 6, an insert member slidably positioned in said block and through which said passage extends and said member bearing against said plate, and a spring resiliently urging said insert member against said plate.

PHILIP MacKENZIE.